US009319380B2

(12) United States Patent
Lukacs et al.

(10) Patent No.: US 9,319,380 B2
(45) Date of Patent: Apr. 19, 2016

(54) BELOW-OS SECURITY SOLUTION FOR DISTRIBUTED NETWORK ENDPOINTS

(71) Applicant: Bitdefender IPR Management Ltd., Nicosia (CY)

(72) Inventors: Sandor Lukacs, Floresti (RO); Adrian V. Colesa, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 3 days.

(21) Appl. No.: 14/221,158

(22) Filed: Mar. 20, 2014

(65) Prior Publication Data

US 2015/0271139 A1 Sep. 24, 2015

(51) Int. Cl.
*H04L 29/06* (2006.01)
*G06F 9/44* (2006.01)
*G06F 21/57* (2013.01)

(52) U.S. Cl.
CPC .......... *H04L 63/0209* (2013.01); *G06F 9/4406* (2013.01); *G06F 21/57* (2013.01); *G06F 21/575* (2013.01); *H04L 63/14* (2013.01)

(58) Field of Classification Search
CPC ... H04L 63/0209; H04L 63/14; G06F 9/4406; G06F 21/575; G06F 21/57
See application file for complete search history.

(56) References Cited

U.S. PATENT DOCUMENTS

| | | | |
|---|---|---|---|
| 7,962,738 B2 | 6/2011 | Zimmer et al. | |
| 7,979,260 B1 | 7/2011 | Sobel et al. | |
| 8,037,290 B1 | 10/2011 | Stutton | |
| 8,495,624 B2 | 7/2013 | Banerjee et al. | |
| 8,510,859 B2 | 8/2013 | Zimmer et al. | |
| 8,583,908 B2 | 11/2013 | Zimmer et al. | |
| 8,589,525 B2 | 11/2013 | Eylon et al. | |
| 8,621,460 B2 | 12/2013 | Evans et al. | |
| 2005/0251867 A1* | 11/2005 | Sastry et al. | 726/34 |
| 2006/0236127 A1* | 10/2006 | Kurien | G06F 9/5077 713/193 |
| 2008/0163209 A1* | 7/2008 | Rozas | G06F 9/45558 718/1 |
| 2009/0164770 A1* | 6/2009 | Zimmer et al. | 713/2 |

(Continued)

FOREIGN PATENT DOCUMENTS

| | | |
|---|---|---|
| WO | 2009123640 A1 | 10/2009 |
| WO | WO 2012128744 A1 * | 9/2012 |
| WO | WO 2013046068 A1 * | 4/2013 |

OTHER PUBLICATIONS

Xia et al., Defending against VM Rollback Attack, Jun. 2012, 42nd International Conference on Dependable Systems and Networks Workshops, pp. 1-5.*

(Continued)

*Primary Examiner* — Kenneth Chang
(74) *Attorney, Agent, or Firm* — Law Office of Andrei D Popovici, PC

(57) ABSTRACT

Described systems and methods allow protecting a client system, such as a computer system or smartphone, from malware. In some embodiments, a network regulator device is used to distribute a bootable image of a hypervisor, on demand, to each of a set of client systems connected to a network. After booting on a client system, the hypervisor loads the local OS and applications into a virtual machine. Integrity measurements of the hypervisor and/or OS are sent to the network regulator for verification. When the network regulator determines that software executing on a client system, such as the hypervisor and/or the OS, are not in a trusted state, the network regulator may block access of the respective client system to the network.

20 Claims, 8 Drawing Sheets

(56) References Cited

U.S. PATENT DOCUMENTS

| | | | |
|---|---|---|---|
| 2009/0172781 A1* | 7/2009 | Masuoka et al. | 726/3 |
| 2009/0204964 A1* | 8/2009 | Foley | G06F 21/53 718/1 |
| 2010/0037041 A1 | 2/2010 | Joshi et al. | |
| 2010/0037296 A1* | 2/2010 | Silverstone | 726/3 |
| 2011/0265183 A1 | 10/2011 | Wu et al. | |
| 2012/0239729 A1 | 9/2012 | Hefter | |
| 2012/0265976 A1 | 10/2012 | Spiers et al. | |
| 2012/0266231 A1 | 10/2012 | Spiers et al. | |
| 2012/0284718 A1 | 11/2012 | Dahlstedt | |
| 2013/0179669 A1 | 7/2013 | Song et al. | |
| 2013/0290694 A1 | 10/2013 | Civilini et al. | |

OTHER PUBLICATIONS

European Patent Office, International Search Report and Written Opinion Mailed Oct. 15, 2015 for PCT International Application No. PCT/RO2015/050002, international filing date Mar. 18, 2015, priority date Mar. 20, 2014.

Redhat, "Red Hat Enterprise Linux 6 Hypervisor Deployment Guide," downloaded on Dec. 31, 2015 from https://access.redhat.com/documentation/en-US/Red_Hat_Enterprise_Linux/6/pdf/Hypervisor_Deployment_Guide/Red_Hat_Enterprise_Linux-6-Hypervisor_Deployment_Guide-en-US.pdf, document contains copyright notice Copyright © 2012; the year of publication is sufficiently earlier than the effective U.S. filing date and any foreign priority date so that the particular month of publication is not in issue.

Garfinkel et al., "Terra: a virtual machine-based platform for trusted computing," SOSP '03 Proceedings of the nineteenth ACM symposium on Operating systems principles, pp. 193-206, ACM New York, NY, USA © 2003; the year of publication is sufficiently earlier than the effective U.S. filing date and any foreign priority date so that the particular month of publication is not in issue.

* cited by examiner

BELOW-OS SECURITY SOLUTION FOR DISTRIBUTED NETWORK ENDPOINTS

BACKGROUND

The invention relates to systems and methods for protecting computer networks and individual computer systems from malware, and in particular systems and methods that use hardware virtualization technology.

An increasing number of goods and services are currently provided online, through electronic communication networks such as the Internet. Examples of online services include, among others, electronic communications, online banking, e-commerce, audio/video conferencing, and online gaming. Providing such services online is often associated with a risk of data theft and/or loss of privacy for a user.

Malicious software, also known as malware, affects a great number of computer systems and other electronic devices worldwide. In its many forms such as computer viruses, worms, exploits, and rootkits, malware presents a serious risk to millions of computer users, making them vulnerable to loss of data and sensitive information, to identity theft, and to loss of productivity, among others. Malware may attempt to steal private or sensitive information, e.g., by intercepting keyboard inputs corresponding to a user's password or credit card number, by intercepting signals from a audio/video device connected to a user's computer system, or by intercepting communication between the malware-infected computer system and a remote computer system. Moreover, malware may disable software such as firewalls and other network filters configured to prevent the respective computer system from carrying out unauthorized communication with remote parties.

There is considerable interest in developing anti-malware solutions which are robust, scalable, easily and safely deployable, and adapted to any network configuration.

SUMMARY

According to one aspect, a network regulator comprises at least one processor configured to execute a client boot agent and a network filter connected to the boot agent. The client boot agent is configured to transmit a hypervisor image to the client system in response to receiving a boot request from a client system over the network, wherein executing the hypervisor image on a processor of the client system causes the client system to launch a hypervisor. The hypervisor is configured to expose a client virtual machine (VM) on the client system, the client VM controlled by the hypervisor, and to load an operating system into the client VM, the operating system loaded from a local storage device of the client system. The network filter is configured to determine whether the hypervisor is in a trusted state according to a hypervisor integrity measurement received from the client system, the hypervisor integrity measurement characterizing the integrity of the hypervisor. The network filter is further configured, in response to determining whether the hypervisor is in the trusted state, to allow electronic communications from the client system to a recipient system when the hypervisor is in the trusted state, and to block electronic communications from the client system to the recipient system when the hypervisor is not in the trusted state. The recipient system is connected to the network regulator over the network.

According to another aspect, a client system comprises at least one processor configured to receive from a network regulator a hypervisor image, in response to sending a boot request to the network regulator over a network. The at least one processor is further configured to execute the hypervisor image to launch a hypervisor, and in response to launching the hypervisor, to expose a client VM on the client system, the client VM controlled by the hypervisor, and to load an operating system into the client VM, the operating system loaded from a local storage device of the client system. The at least one processor is further configured to send a hypervisor integrity measurement to the network regulator, the hypervisor integrity measurement characterizing the integrity of the hypervisor. The network regulator is configured to determine whether the hypervisor is in a trusted state according to the hypervisor integrity measurement, and in response, to allow electronic communications from the client system to a recipient system when the hypervisor is in the trusted state, and to block electronic communications from the client system to the recipient system when the hypervisor is not in the trusted state. The recipient system is connected to the network regulator over the network.

According to another aspect, a non-transitory computer-readable medium stores instructions which, when executed on a processor of a network regulator, cause the network regulator to form a client boot agent and a network filter connected to the boot agent. The client boot agent is configured to transmit a hypervisor image to the client system in response to receiving a boot request from a client system over the network, wherein executing the hypervisor image on a processor of the client system causes the client system to launch a hypervisor. The hypervisor is configured to expose a client VM on the client system, the client VM controlled by the hypervisor, and to load an operating system into the client VM, the operating system loaded from a local storage device of the client system. The network filter is configured to determine whether the hypervisor is in a trusted state according to a hypervisor integrity measurement received from the client system, the hypervisor integrity measurement characterizing the integrity of the hypervisor. The network filter is further configured, in response to determining whether the hypervisor is in the trusted state, to allow electronic communications from the client system to a recipient system when the hypervisor is in the trusted state, and to block electronic communications from the client system to the recipient system when the hypervisor is not in the trusted state. The recipient system is connected to the network regulator over the network.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a hash is an output of a hash function. Unless otherwise specified, a hash function is a mathematical transformation mapping a variable-length sequence of symbols (e.g. characters, bits) to fixed-length data such as a number or bit string. Unless otherwise specified, a page represents the smallest unit of virtualized memory individually mapped to a physical memory of a computer system. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
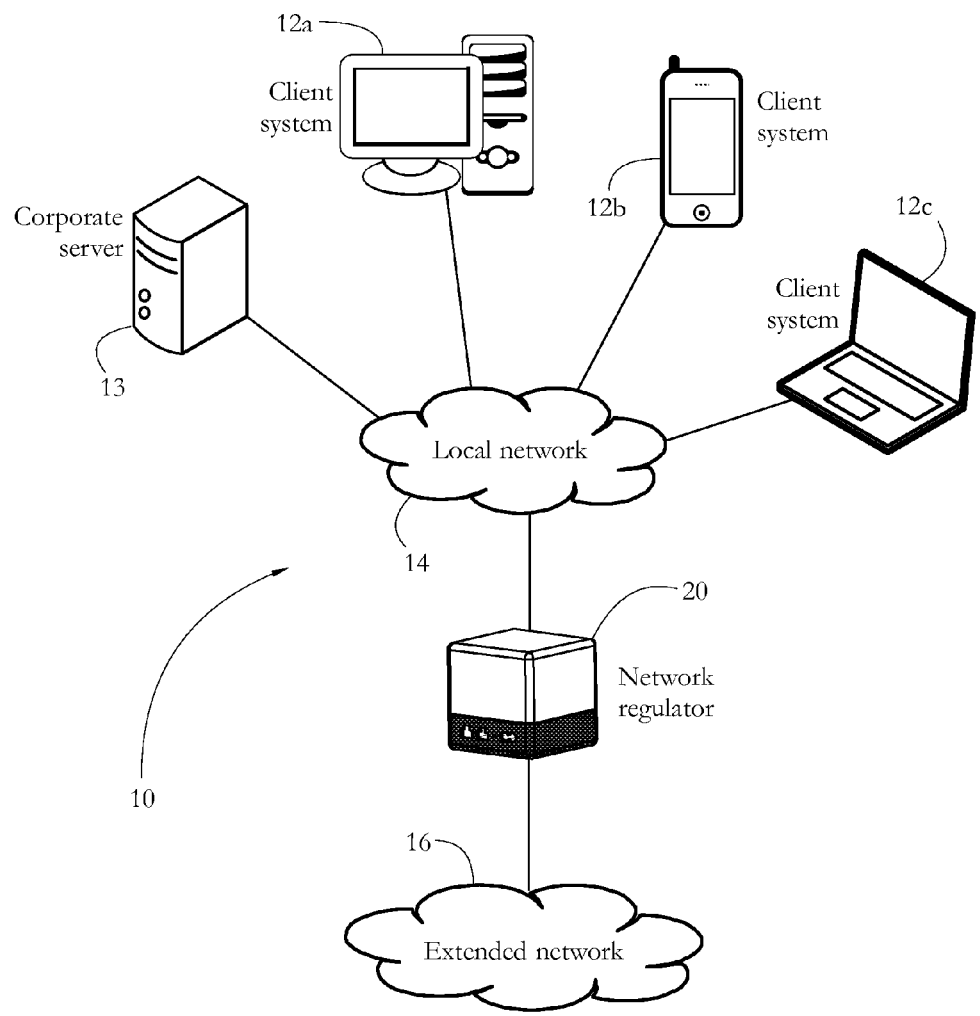
FIG. 1 shows an exemplary set of client systems configured to receive a below-operating system (OS) security solution from a network regulator device according to some embodiments of the present invention.

FIG. 1 shows an exemplary data security system 10 providing malware protection according to some embodiments of the present invention. System 10 comprises a set of client systems 12a-c and a network regulator device 20, interconnected via a local communication network 14. In some embodiments, local network 14 includes at least an Open System Interconnection (OSI) layer 2 device, such as a network switch. In one example, client systems 12a-c may represent corporate end-user devices, such as personal computers and laptops, while network 14 may represent a corporate Intranet and/or a local area network (LAN). Client systems 12a-c may further connect via network 14 to a corporate server 13, for instance to access and/or exchange sensitive data. In another example, client systems 12a-c may represent electronic devices such as laptops, smartphones, game consoles, and other home appliances, interconnected by a home network. Client systems 12a-c may be configured to request and receive a below-operating system security solution from network regulator 20, as shown in detail below.

In some embodiments, network regulator 20 is an electronic device/computer appliance including a processor and a memory unit, and configurable to control access of devices 12a-c to an extended communication network 16, which may include a wide area network (WAN) such as the Internet. In some embodiments, extended network 16 includes at least one OSI layer 4 device, such as a router. In one exemplary configuration, network regulator 20 provides a unique access point to extended network 16 from within local network 14, i.e., all data traffic between client systems 12a-c and extended network 16 is routed through network regulator 20. In some embodiments, controlling access to network 16 comprises selectively allowing, blocking, or in any other way restricting data traffic between a client system 12a-c and an electronic device connected to network 16, but not connected to local network 14. Exemplary network regulators 20 include a router, a wireless access point, a firewall appliance, a network gateway, and other network appliances configurable to control access of client systems 12a-c to extended network 16. Beside controlling data traffic, some embodiments of network regulator 20 may be configured to deliver a below-operating system security solution to client systems 12a-c and/or to verify the integrity of software executing on client systems 12a-c.

Figure 2:
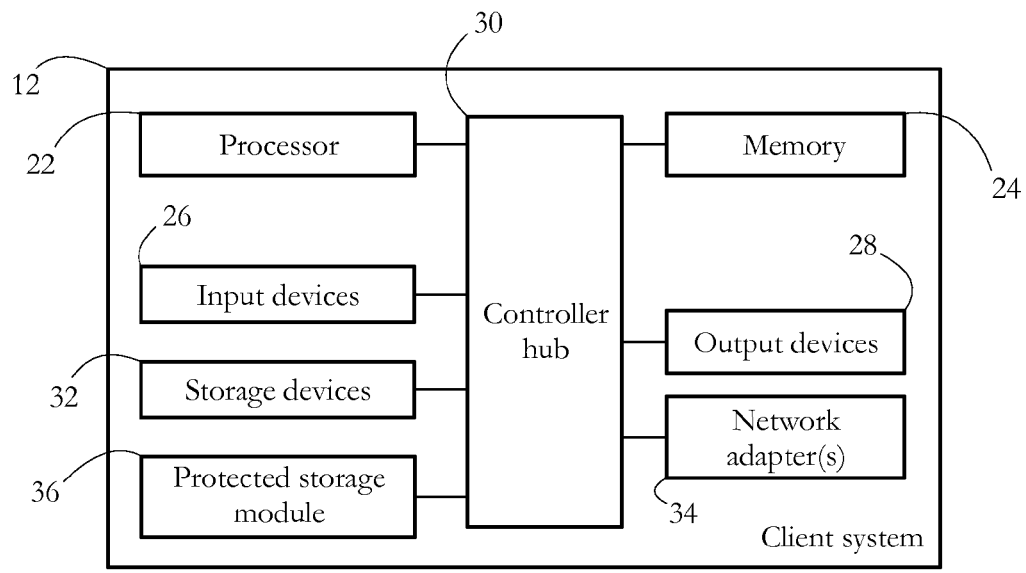
FIG. 2 shows an exemplary hardware configuration of a client system according to some embodiments of the present invention.

FIG. 2 shows an exemplary hardware configuration of a client system 12, such as client systems 12a-c in FIG. 1. A computer system was chosen for illustrative purposes; other devices such as smartphones may have a different configuration. In some embodiments, client system 12 comprises a processor 22, a memory unit 24, a set of input devices 26, a set of output devices 28, a set of storage devices 32, and a set of network adapter(s) 34, all interconnected by a controller hub 30.

In some embodiments, processor 22 comprises a physical device (e.g. multi-core integrated circuit) configured to execute computational and/or logical operations with a set of signals and/or data. In some embodiments, such logical operations are delivered to processor 22 in the form of a sequence of processor instructions (e.g. machine code or other type of software). Memory unit 24 may comprise volatile computer-readable media (e.g. RAM) storing data/signals accessed or generated by processor 22 in the course of carrying out instructions. Input devices 26 may include computer keyboards, mice, and microphones, among others, including the respective hardware interfaces and/or adapters enabling a user to introduce data and/or instructions into client system 12. Output devices 28 may include display devices such as monitors and speakers among others, as well as hardware interfaces/adapters such as graphic cards, enabling client system 12 to communicate data to a user. In some embodiments, input devices 26 and output devices 28 may share a common piece of hardware, as in the case of touch-screen devices. Storage devices 32 include computer-readable media enabling the non-volatile storage, reading, and writing of software instructions and/or data. Exemplary storage devices 32 include magnetic and optical disks and flash memory devices, as well as removable media such as CD and/or DVD disks and drives. Network adapter(s) 34 enable client system 12 to connect to network 14 and/or to other devices/computer systems. Controller hub 30 represents the plurality of system, peripheral, and/or chipset buses, and/or all other circuitry enabling the communication between processor 22 and devices 24, 26, 28, 32, and 34. For instance, controller hub 30 may include a memory controller, an input/output (I/O) controller, and an interrupt controller, among others.

In some embodiments, client system 12 further includes a protected storage module 36 connected to hub 30. Module 36 comprises a hardware device, e.g., an integrated circuit, configured to securely store sensitive information, such as integrity measurements of software executing on client system 12. Module 36 may comprise a persistent memory configured so that software executing on the respective client system may not overwrite a content of the respective module. Such persistent memory may be used to store a cryptographic key uniquely associated with the respective module and/or with client system 12 (such keys are known as endorsement keys in some embodiments). Module 36 may also comprise a writable memory, configured so that selected software objects executing on the respective client system are allowed to overwrite data stored in the writable memory. For instance, module 36 may be configured so that only software components of a hypervisor and/or other software executing at root privilege level may have write permission to a memory of module 36 (see more details below). In some embodiments, protected storage module 36 also comprises a cryptographic processor configured to generate cryptographic keys, to compute hashes, and/or to perform encryption/decryption of data. Exemplary protected storage modules 36 include trusted platform module (TPM) chips produced by various hardware manufacturers. In an alternative embodiment, protected storage module 36 may be software-emulated, for instance using ARM TrustZone® technology.

Figure 3:
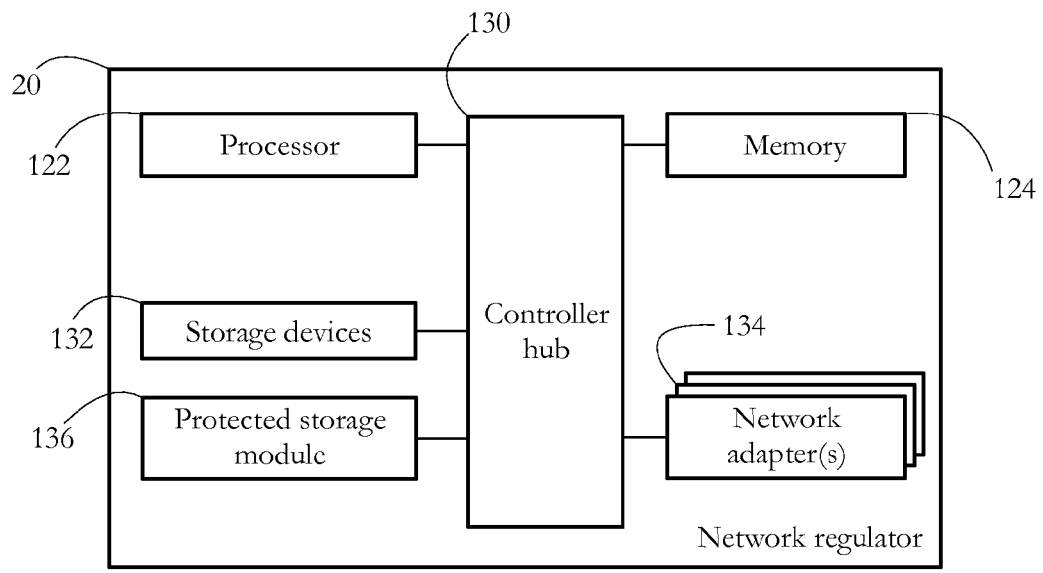
FIG. 3 shows an exemplary hardware configuration of the network regulator according to some embodiments of the present invention.

FIG. 3 shows an exemplary hardware configuration of network regulator 20, according to some embodiments of the present invention. Regulator 20 comprises a processor 122, a memory 124, storage devices 132, network adapter(s) 134, and protected storage module 136. Processor 122 may execute computational and/or logical operations with a set of signals and/or data. Memory unit 124 may comprise volatile computer-readable media (e.g. RAM) storing data/signals accessed or generated by processor 122 in the course of carrying out operations. Storage devices 132 include computer-readable media enabling the non-volatile storage, reading, and writing of software instructions and/or data. For instance, storage device 132 may be configured to store a database of hypervisor images and/or a database of software integrity measurements, as shown below. Network adapters 134 may connect network regulator 20 to local network 14 and extended network 16, and enable data transmission between client systems 12a-c and other computer systems/devices connected to network 16.

Figure 4:
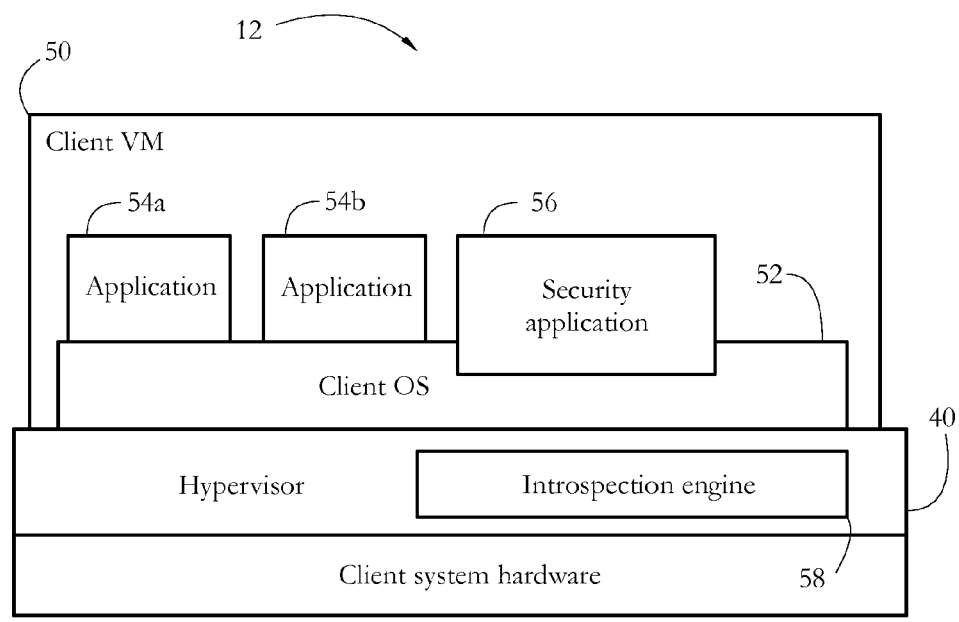
FIG. 4 shows an exemplary set of software objects executing on the client system according to some embodiments of the present invention.

FIG. 4 shows an exemplary software configuration of client system 12. In some embodiments, client system 12 is configured to execute a hypervisor (HV) 40, the hypervisor further configured to expose a client virtual machine (VM) 50. Virtual machine 50 comprises a software abstraction, for instance an emulation of an actual physical computing device (e.g., client system 12), the emulation enabling VM 50 to execute a client operating system (OS) 52 and/or a set of other software applications 54a-b, as if VM 50 possessed a set of physical hardware devices. In some embodiments, hypervisor 40, also known in the art as a virtual machine monitor (VMM), comprises software which creates the virtual environment of client VM 50, an operation known in the art of virtualization as exposing VM 50. Exposing VM 50 may include creating a plurality of virtual devices, each virtual device emulating the operation and functionality of a physical hardware device of client system 12, such as a processor or a memory controller, among others. Hypervisor 40 may further assign a set of virtual devices to each exposed VM executing on client system 12. Examples of popular hypervisors include the VMware ESXi™ from VMware Inc. and the open-source Xen hypervisor, among others.

Client OS 52 provides an interface between software applications, such as applications 54a-b, and the virtualized hardware devices of client VM 50. Client OS 52 may comprise any widely available operating system such as Windows®, MacOS®, Linux®, iOS®, or Android™, among others. Applications 54a-b generically represent any application such as word processing, image processing, media player, database, calendar, personal contact management, browser, gaming, voice communication, and data communication applications, among others.

Some hardware platforms feature a hierarchy of protection domains, also known in the art as layers or protection rings. Each such layer or ring is associated to a distinct processor privilege level, so that software executing at a certain privilege level cannot directly access resources requiring higher processor privileges. When a software object attempts to perform an action which is not allowed within the respective privilege level, the attempt may trigger a processor event, such as an exception or a fault. In some embodiments, hypervisor 40 takes control of processor 22 at the most privileged level (e.g., VMXroot on Intel® platforms supporting virtualization, also known generically as ring −1 or root mode). Most components of client OS 52 may execute at a privilege level typically known as ring 0 or kernel-mode, less privileged than hypervisor 40. From this perspective, hypervisor 40 is said to execute below OS 52. Applications 54a-b typically execute with lesser processor privileges than client OS 52, for instance in ring 3 or user-mode.

In some embodiments, client VM 50 further executes a security application 56, such as an anti-malware tool including, for instance, anti-virus and anti-spyware capabilities. Application 56 may be configured to scan software executing within client VM 50 for malware and/or to stop such software from performing malicious or malice-indicative actions. Some components of application 56 may execute at a processor privilege level similar to that of OS 52 (e.g., kernel mode), while other components may execute at lesser processor privilege (e.g., user-mode).

In some embodiments, an introspection engine 58 executes at a processor privilege level similar to hypervisor 40, i.e. below OS 52, and is configured to perform introspection of VM 50. Such introspection may include analyzing a behavior of a software object executing within VM 50, determining and/or accessing memory addresses of such software objects, and analyzing a content of memory located at such addresses, among others. Engine 58 may be further configured to protect certain software, such as components of OS 52 and security application 56, from malware. Protection may be achieved using any method known in the art, for instance by protecting a content of a memory page hosting a part of the protected object. Introspection engine 58 may be integrated into hypervisor 40 or may be installed as a separate component. The operation of introspection engine 58 will be further detailed below.

Figure 5:
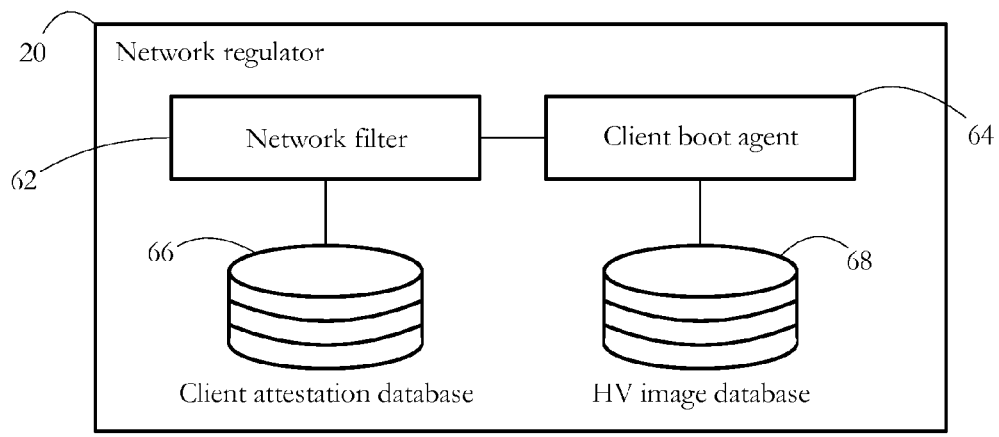
FIG. 5 illustrates exemplary software objects executing on the network regulator according to some embodiments of the present invention.

FIG. 5 shows exemplary software components executing on network regulator 20 according to some embodiments of the present invention. Regulator 20 may execute a network filter 62 and a client boot agent 64 connected to network filter 62. Network filter 62 may be configured to control access of client systems 12a-c to extended network 16. Controlling access of a client system may comprise verifying the integrity of software components executing on the respective client system, and, when integrity is not confirmed, refusing a network connection request from the client system, and/or selectively denying the respective client system access to certain addresses on extended network 16. Network filter 62 may be further configured to analyze network packets according to a packet header and/or payload, to determine whether such packets carry malware. In some embodiments, client boot agent 64 is configured to receive a boot request from a client system and in response, to transmit a bootable image of hypervisor 40 to the respective client system.

Network regulator 20 may further include a client attestation database 66 and a hypervisor image database 68. Databases 66 and 68 may be stored on storage devices 132 of network regulator 20, or may reside on computer-readable media connected to regulator 20. Attestation database 66 includes a set of reference integrity measurements determined for client systems 12a-c. In some embodiments, each integrity measurement includes at least one hash of a memory image of a software object installed on a client system, and characterizes the integrity of the respective software object. For example, such an integrity measurement may allow network regulator 20 to determine whether the respective software object is in a trusted state, i.e., has not been modified compared to a reference, trusted state. Measured software objects may include a firmware interface (e.g., BIOS), a component of client OS 52, and hypervisor 40, among others. Integrity measurements may be encrypted and/or cryptographically signed, for instance by a cryptographic processor of protected storage module 36. Each integrity measurement may be marked/indexed with an indicator of the client system for which it was calculated, to allow network filter 62 to selectively retrieve the respective integrity measurement from database 66.

HV image database 68 may store a set of bootable images of HV 40. In some embodiments, a HV image includes a data file encoding a set of processor instructions, which, when executed by a processor of a client system, launches an instance of hypervisor 40 on the respective client system. An exemplary HV image includes a binary executable file. In another example, the HV image includes several code and data sections, the ensemble of which create HV 40. Each HV image stored in database 68 may be tailored to the hardware specifications of a client system (e.g., smartphone vs. personal computer, various models within each category) and/or to a type of client OS (e.g., Windows® vs. Android®, various versions or releases). Each HV image may be configured by a network administrator to have a distinct set of features. In some embodiments, a plurality of prefabricated HV images may be obtained from a security vendor. The HV images may come pre-packaged with network regulator 20 or may be downloaded by network regulator 20 from a dedicated server. HV images may be further kept up-to-date via periodic and/or on-demand software updates.

Figure 6:
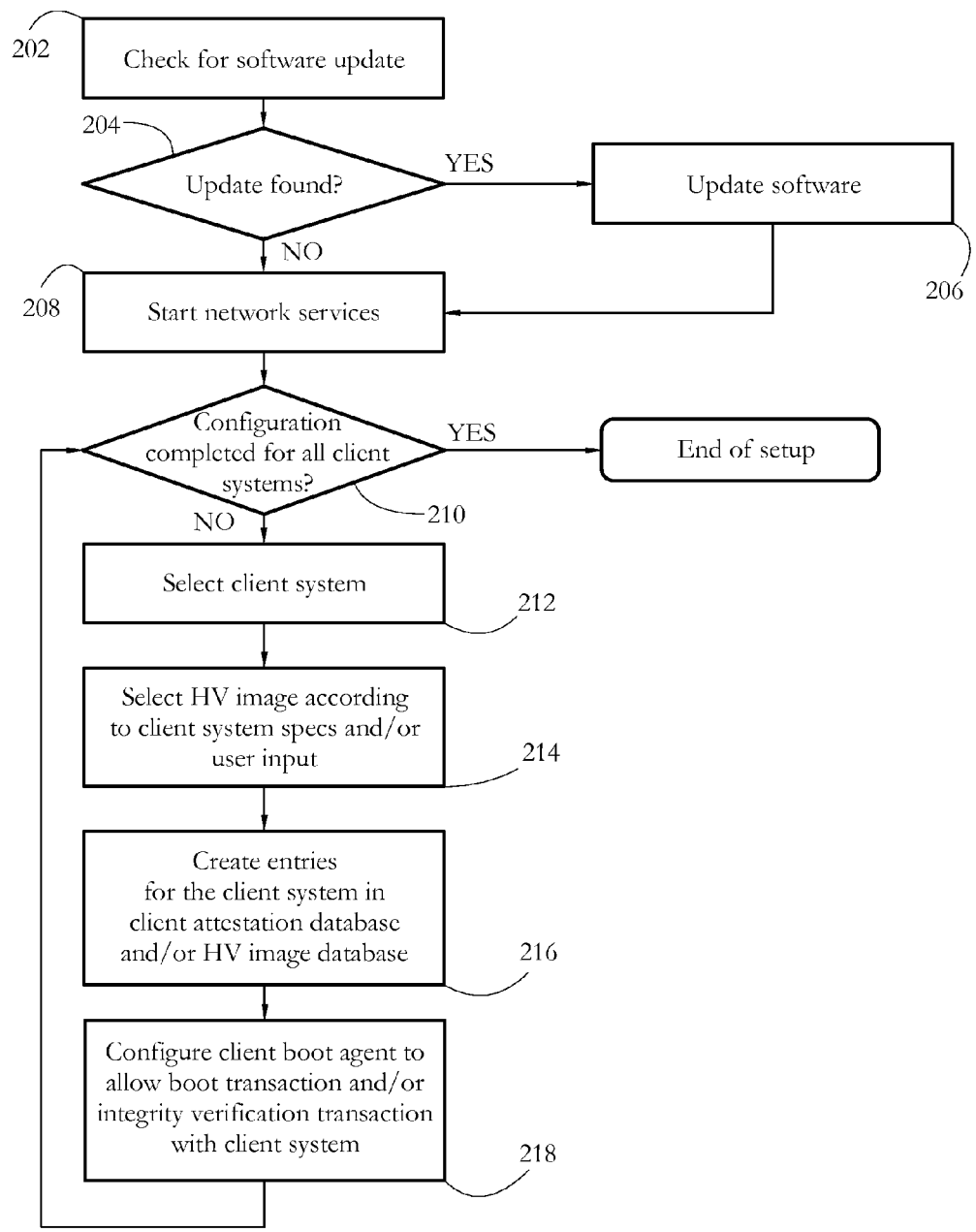
FIG. 6 illustrates an exemplary sequence of steps performed by the network regulator to prepare delivery of the below-OS security solution to the client system according to some embodiments of the present invention.

FIG. 6 illustrates an exemplary sequence of steps performed by network regulator 20 to set up malware protection according to some embodiments of the present invention.

When installing network regulator 20, a network administrator may place regulator 20 in a network gateway configuration, wherein all connections between client systems 12a-c and extended network 16 must go through regulator 20. In a sequence of steps 202-204-206, regulator 20 may perform a software update, for instance to update a set of HV images. A step 208 may start network services of regulator 20. Such services may implement any network communication protocol used in the art, according to standards such as Ethernet, wireless LAN, and Bluetooth, among others. In some embodiments, network services enabled by regulator 20 further include implementations of the dynamic host configuration protocol (DHCP), and trivial file transfer protocol (TFTP), among others. Other examples of network services employ encrypted communications protocols such as secure file transfer protocol (SFTP), and SSH File Transfer Protocol, among others.

A sequence of steps 210-218 may be repeated for each client system 12a-c on local network 14. A step 212 selects a client system for configuration. In an exemplary embodiment, client systems 12a-c available for configuration are displayed within a graphical user interface (GUI) exposed by regulator 20. In another example, regulator 20 may expose a command line interface (CLI) or a web-based configuration interface, allowing an administrator to select and configure each client. In a step 214, regulator 20 may associate a bootable HV image to the selected client system. A suitable HV image may be selected from HV image database 68 according to hardware and/or software specifications of the selected client system. For instance, the selection may be done according to a type of device (smartphone vs. personal computer), according to a processor speed and/or amount of available memory, according to a type of OS (Windows® vs. Linux® or iOS®), etc. The selection may be automatic or assisted by the network administrator.

In a step 216, network regulator 20 may create entries for the selected client system in HV image database 68 and/or client attestation database 66, to enable an unambiguous association between the respective client system and the selected HV image, and between the client system and the client system's integrity measurements, respectively. A step 208 may configure client boot agent 64 to allow a boot transaction and/or an integrity verification transaction between regulator 20 and the selected client system. In an exemplary embodiment, step 208 includes configuring network regulator 20 to act as a pre-boot execution environment (PXE) server for client systems 12a-c.

In a separate setup operation, the network administration may configure each client system 12a-c to initiate a boot transaction with network regulator 20. For instance, the network administrator may configure client systems 12a-c to boot from network, indicating regulator 20 as the boot server. In one such embodiment, client systems 12a-c may be configured to operate a PXE client module, the module configured to connect to network regulator 20 to request a bootable HV image, as shown below.

Figure 7:
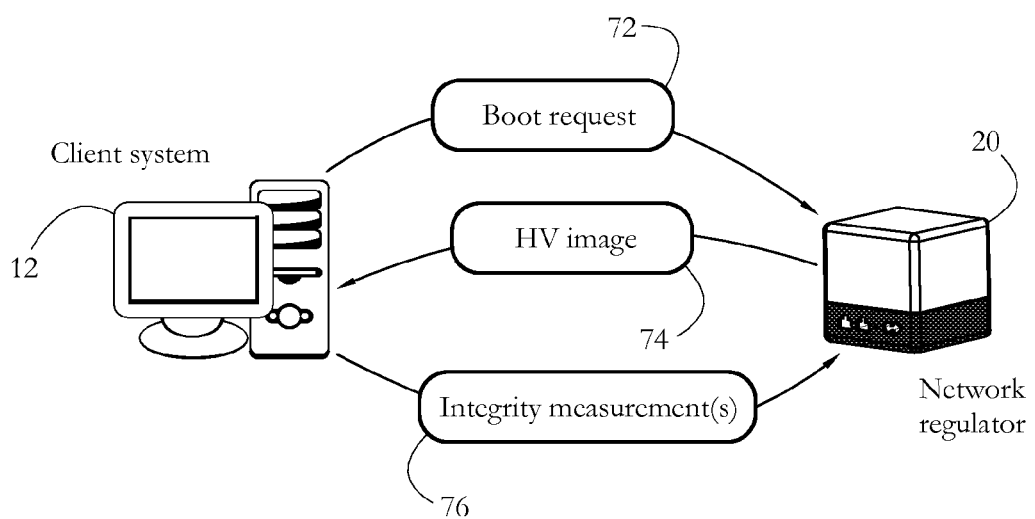
FIG. 7 shows an exemplary data exchange between the network regulator and the client system according to some embodiments of the present invention, the data exchange forming part of a secure boot of the client system.

An exemplary boot transaction between client system 12 and network regulator 20 is illustrated in FIG. 7. When a user starts client system 12, firmware of client system 12, such as a boot loader or PXE client module, may send a boot request 72 to network regulator 20. In response, network regulator 20 may transmit a HV image 74 to the requesting client system 12.

Figure 8:
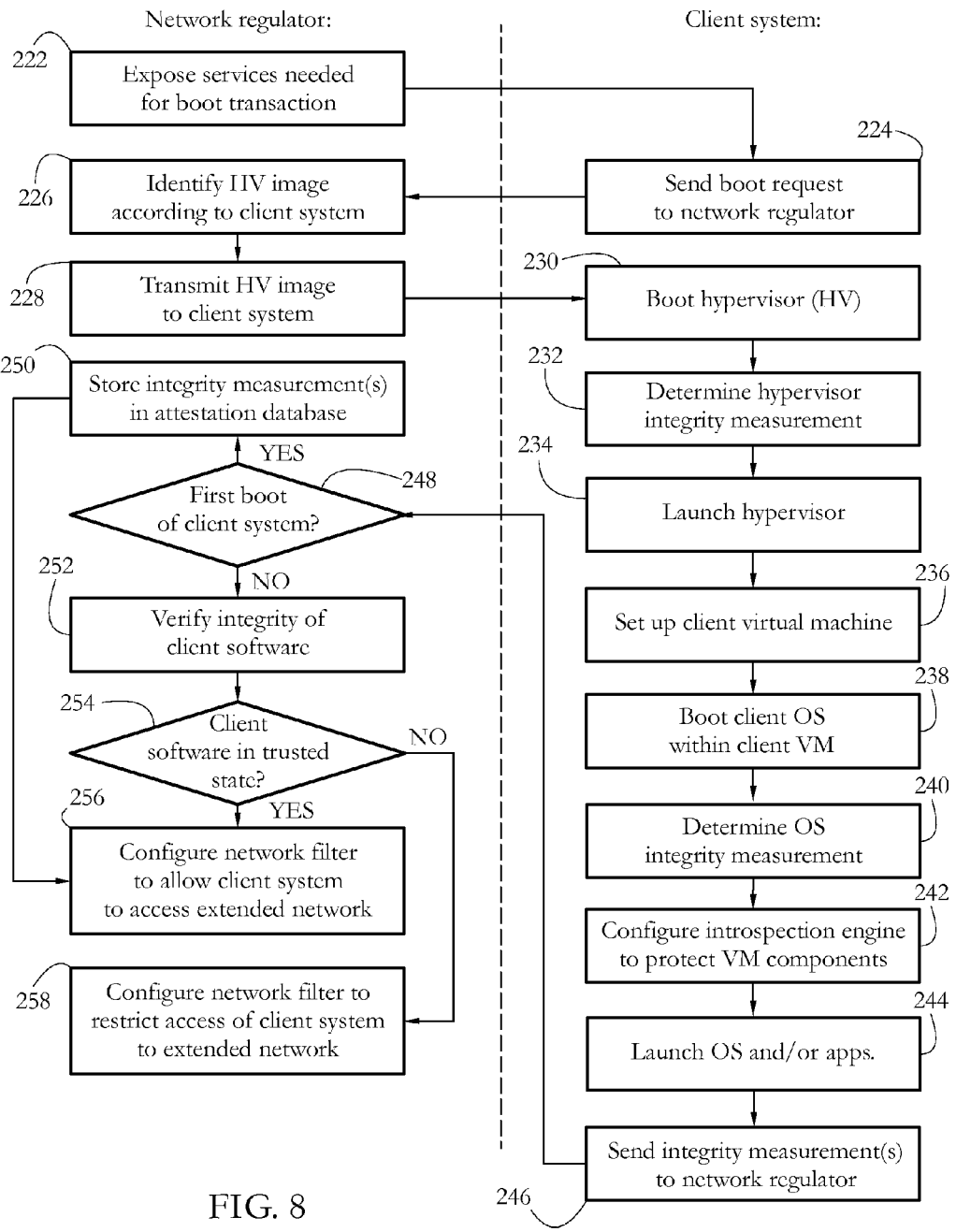
FIG. 8 shows an exemplary sequence of steps performed by the client system and/or network regulator to launch the client system and to configure access of the client system to an extended network, according to some embodiments of the present invention.

A more detailed sequence of steps illustrating the operation of client system 12 and network regulator 20 is shown in FIG. 8. In a step 222, regulator 20 exposes network services needed to perform boot transactions with client systems 12a-c, for instance, services implementing a PXE environment. In a step 224, client system 12 sends boot request 72 to network regulator 20. An exemplary boot request includes a request for an address (e.g., file path) of a bootable image file. In response to receiving boot request 72, in a step 226, regulator 20 may select HV image 74 according to the identity of the requesting client system. Next, in a step 228, regulator 20 may transmit HV image 74 to client system 12, for example by establishing a communication channel between regulator 20 and client system 12, and allowing client system 12 to download HV image 74.

In a sequence of step 230-232, client system 12 loads hypervisor 40 into memory and determines a hypervisor integrity measurement, such as a hash of the loaded image of HV 40. In some embodiments, such measurements are taken before launching HV 40 into execution, and may serve to verify whether HV 40 was not corrupted, for instance by malware executing on client system 12. HV integrity measurements may be obtained according to any method/protocol known in the art. An exemplary integrity measurement operation comprises loading HV image 74 into memory, computing a hash of the loaded memory image, and cryptographically signing the respective hash with a digital signature/key specific to the respective client system, such as an endorsement key stored in protected storage module 36. In some embodiments, such integrity measurements may be carried out as part of a measured boot of HV 40, the measured boot performed using trusted execution technology (TXT) from Intel®.

After launching HV 40 (step 234), in a step 236, HV 40 exposes the virtual environment of client VM 50, which may include creating and configuring virtual devices of VM 50, such as a virtual processor, a virtual memory unit, and a virtual memory controller, among others. In some embodiments, HV 40 only virtualizes a subset of the hardware devices of client system 12. Other devices, such as input devices 26, output devices 28, and network adapter(s) 34 may be accessed directly by software executing within client VM 50, without using an intermediate virtualization layer. Such mixed virtualization configurations are also known in the art as PCI device pass-through, and may be enabled, for instance, using VT-d® technology from Intel®. Pass-through configurations may reduce the computational overhead, improving user experience.

In a step 238, HV 40 may boot client OS 52 within the virtual environment of client VM 50. Step 238 may locate a bootable file of OS 52 on local storage device 32 of client system 12, and load the respective file into memory. HV 40 may further configure client system 12 to present to OS 52 a set of virtualized devices (processor, memory, etc.), instead of the actual physical devices of client system 12.

In a step 240, HV 40 may determine an OS integrity measurement before launching OS 52 into execution. Such measurements may allow a verification of the integrity of OS 52, to ensure that OS 52 has not been modified, possibly with malicious intent, since a previous boot. Integrity measurements may be obtained in a similar fashion to step 232 described above. For instance, an OS integrity measurement may include a hash of a memory image of OS 52, the hash cryptographically signed with a digital signature/key specific to the respective client system.

In a step 242, hypervisor 40 configures introspection engine 58 (see, e.g., FIG. 4) to protect a set of software components executing within client VM 50 from unauthorized modification. In some embodiments, protected components include, among others, critical parts of client OS 52 and parts of security application 56. Step 242 may include identifying a set of memory pages containing code and/or data of the protected components, and protecting the respective memory pages from modification. Page protection may be achieved using several methods known in the art of virtualization and data security. In one such example, HV 40 configures a second-level address translation (SLAT) feature of processor 12, such as an extended page table (EPT) used by client VM 50, to trigger a processor event (e.g., processor exception or page fault) when detecting an attempt to access and/or modify the content of a protected page.

In a step 244, HV 40 may launch client OS 52 and applications, such as 54a-b and 56, into execution. In a step 246, hypervisor 40 may send a set of integrity measurements 76, such as measurements of HV 40 and/or OS 52, to network regulator 20. The order of steps 238-246 may vary from one embodiment to another. Having a functional OS already running on client system 12 may facilitate communication between client system 12 and regulator 20, in the sense that HV 40 may use components of OS 52, such as a network driver, to transmit data to network regulator 20. In some embodiments, HV 40 may perform step 246 before launching OS 52, or even before loading OS 52 into memory, but to communicate with network regulator 20, HV 40 may need to implement additional components, such as a network stack, among others. To facilitate deployment of HV 40 and to improve user experience by expediting boot-up of client system 12, it may be preferable to use a relatively small HV image, corresponding to a version of HV 40 with a minimal set of features.

In response to receiving integrity measurements 76 from client system 12, network regulator 20 may determine whether a reference measurement determined for the respective client system already exists in client attestation database 66. When no such data exists in database 66 for client system 12 (for instance, when the current boot transaction is the first boot transaction attempted with network regulator 20), a step 250 saves integrity measurements 76 in client attestation database 66, associating the respective measurements with client system 12. Such integrity measurements will be subsequently used as a reference for later integrity verification of the respective client system. Storing integrity measurements in database 66 may be conditioned upon administrator approval (for instance, regulator 20 may ask a user to confirm before committing the integrity measurement to storage).

When reference values for integrity measurements already exist in attestation database 66, in a step 252, network regulator 20 may verify the integrity of software components executing on client system 12. Integrity verification thus determines whether the respective components have been modified/corrupted since the computation of the reference hash, for instance by malware executing on the client system, or by a user having access to the client system. Integrity verification may comprise comparing current integrity measurements 76 to reference integrity measurements saved for the respective client system in attestation database 66. A match between a current hash and the corresponding reference hash stored in database 66 may indicate that the respective measured object (e.g., HV 40 and/or client OS 52) is in a trusted state. In some embodiments, the trusted state comprises the original state of the measured component, i.e., the state in which the respective component was when the reference integrity measurement was performed. For instance, in the case of HV 40, the trusted state represents the exact version of HV 40 received from network regulator 20 at boot time. When HV 40 is in a trusted state, network regulator 20 may configure network filter 62 to allow access of client system 12 to extended network 16 (step 256). Some embodiments require that both HV 40 and client OS 52 be in the trusted state to allow communication between client 12 and extended network 16.

A mismatch between current integrity measurements 76 and reference measurements indicates a possibly malicious modification of the measured component, e.g., of HV 40. In such cases, a step 258 may configure network filter 66 to restrict access of client system 12 to extended network 16. Restricting access may include, for instance, blocking access of system 12 to addresses within extended network 16. Such restrictions may prevent client system 12 from performing unauthorized communications with a third party on extended network 16, for instance to transmit sensitive information outside of local network 14.

Figure 9:
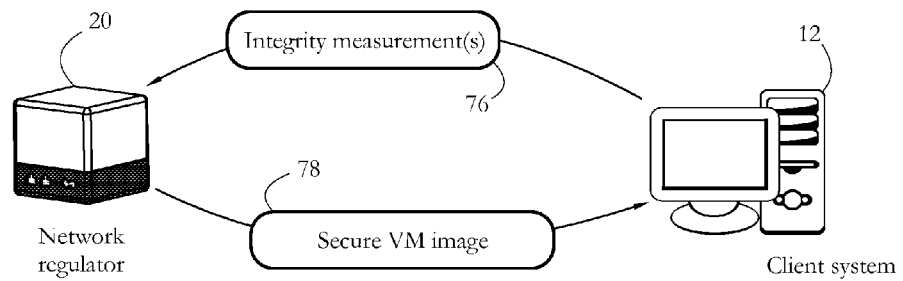
FIG. 9 illustrates an exemplary use case scenario of the present invention, wherein the client system is further configured to receive an image of a secure virtual machine (VM) from the network regulator.
Figure 10:
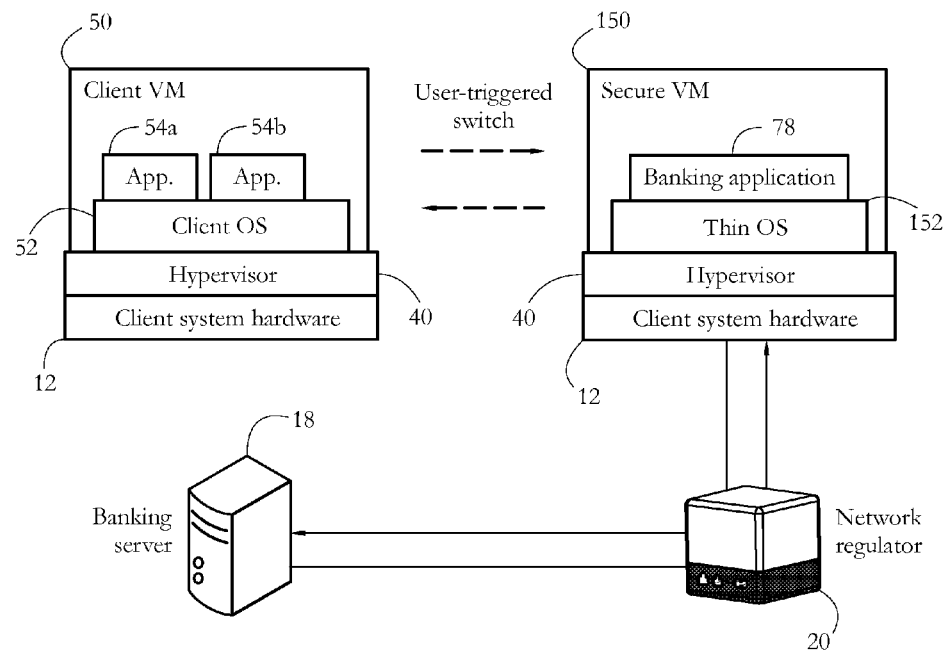
FIG. 10 further illustrates the use case scenario of FIG. 9, wherein the client system is configured to switch from executing a client VM to executing the secure VM in order to carry out secure communication with a banking server.
Figure 11:
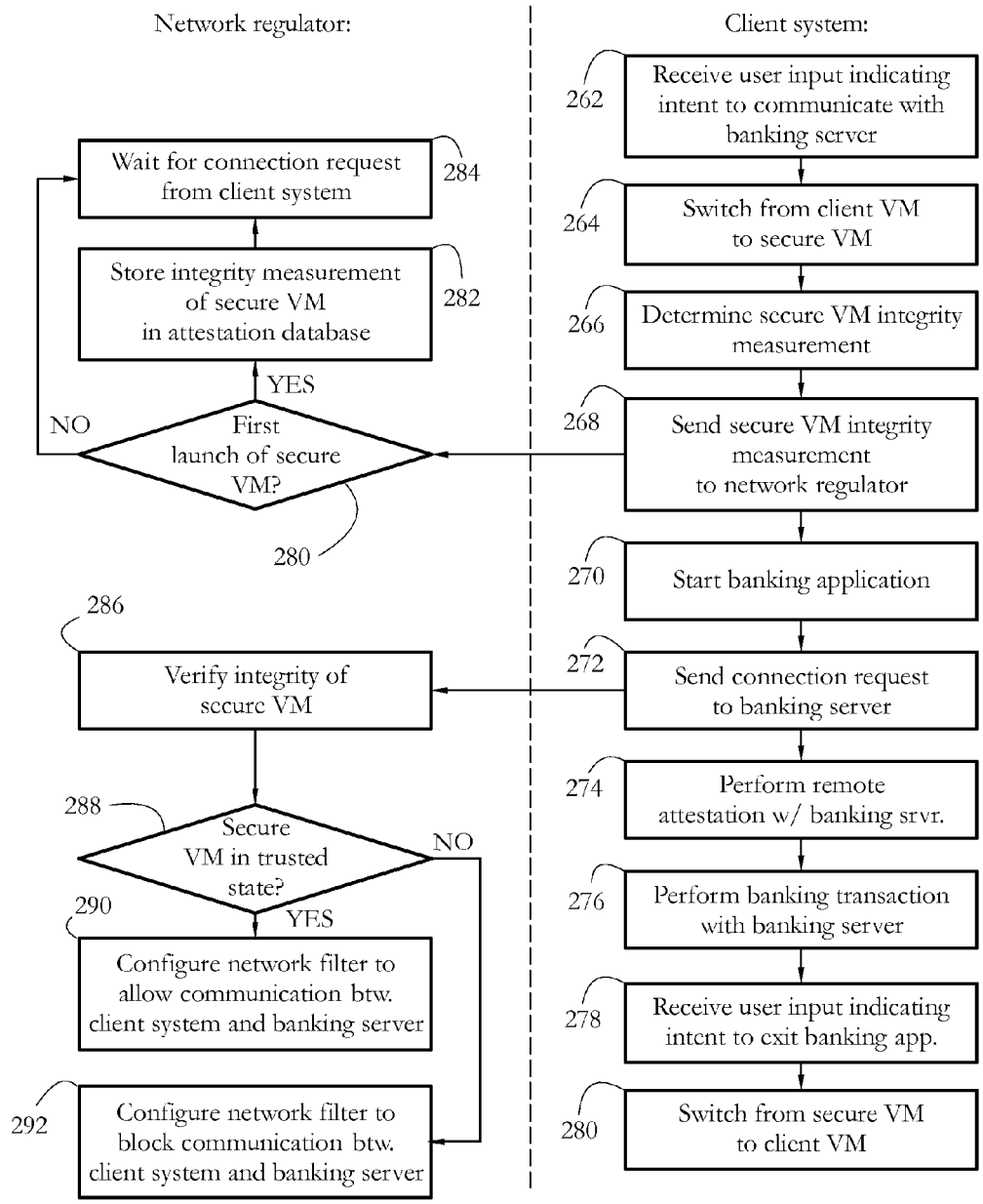
FIG. 11 shows an exemplary sequence of steps performed by the client system and/or network regulator in the use case scenario of FIGS. 9-10.

FIGS. 9-11 illustrate an exemplary use of some embodiments of the present invention, wherein a user of client system 12 wants to carry out a secure communications with a remote service provider, for applications such as online banking, e-commerce, private messaging, and online gaming, among others. FIGS. 9-11 illustrate an online banking application; similar systems may be used for other scenarios requiring a secure exchange of data with a remote server system on extended network 16. To communicate with a remote banking server 18 (FIG. 10), the user may need to launch a dedicated banking application 78. In some embodiments, client system 12 is configured to execute banking application 78 within the virtual environment of a secure VM 150 distinct from client VM 50.

To enable operation of secure VM 150, some embodiments receive a certified secure VM image 78 containing a snapshot of secure VM 150 from network regulator 20, for instance during the launch of client system 12. In one such example, client system 12 may download VM image 78 following launch of client OS 52 (step 244 in FIG. 8). Some embodiments allow the download only in response to network regulator 20 receiving integrity measurements 76 from client system, and only under condition that client system 12 operates in a trusted state. In some embodiments, secure VM 150 may comprise a stripped-down version of an operating system, denoted as a thin OS 152 in FIG. 10. Thin OS 152 may include only a minimum of utilities and services (such as a network driver, for instance), and may be obtained by modifying an instance of an open source OS, such as Linux®.

FIG. 11 shows an exemplary sequence of steps performed by network regulator 20 and client system 12 following the download of secure VM image 78. In a step 262, client system 12 may intercept a trigger event indicative of a user's intent to communicate with banking server 18. In some embodiments, the trigger event includes the user pressing a combination of keyboard keys, or clicking on a GUI element to launch banking application 78. In some embodiments, a software component executing within client VM 50 may communicate the occurrence of the trigger event to hypervisor 40, for instance by causing a VM exit event, which suspends execution of client VM 50 and transfers control of processor 22 from client VM to hypervisor 40. VM exit events may be caused, for instance, by a special class of privileged instructions, such as VMCALL on Intel® platforms.

In response to the occurrence of the trigger event, hypervisor 40 may switch client system 12 from executing client VM 50 to executing secure VM 150. In some embodiments, the switch may be performed by transitioning client VM 50 into a sleep state of power management, such as standby (Advanced Configuration and Power Interface—ACPI state S3) or hibernation (ACPI state S4), subsequently loading secure VM image 78 into memory to instantiate secure VM 150, and re-awakening client system 12. By transitioning client VM 50 to a sleeping state, some embodiments ensure that while secure VM 150 is executing, secure VM 150 has exclusive use of peripheral devices such as a keyboard and a display adapter. Therefore, as a user types a password on a keyboard or receives sensitive information on a screen, wherein the keyboard and the screen are controlled by secure VM 150, software loaded into client VM 50 may not intercept such data, as client VM 50 is in a sleeping state wherein no code is executed.

A sequence of steps 266-268 may determine a VM integrity measurement and send the VM integrity measurement to network regulator 20. The VM integrity measurement may comprise a hash of a memory image of VM 150. In steps 280-282-284, regulator 20 may check whether client attestation database 66 already has a reference measurement for secure VM 150 of the respective client system, and when no, regulator 20 may store the received integrity measurement as a reference. Such storage may be conditioned upon administrator approval (for instance, regulator 20 may ask a user to confirm before committing the integrity measurement to storage).

Secure VM 150 may then launch banking application 78, in a step 270. To initiate a secure communication with banking server 18, in a step 272, application 78 may send a connection request to server 18. In a step 286, network regulator 20 may intercept the connection request and verify the integrity of secure VM 150. Integrity verification may be similar to step 252 described above, for instance, may comprise comparing a hash computed for the current instance of secure VM 150 with a reference hash of secure VM 150 stored in attestation database 66. A hash match may indicate that secure VM 150 is in a trusted state. When VM 150 is indeed in the trusted state, in a step 290, regulator 20 may configure network filter 62 to allow communication between client system 12 and banking server 18. When integrity verification indicates that secure VM 150 is not in a trusted state, a step 292 configures network filter 62 to block communication between client system 12 and banking server 18, thus preventing any sensitive data from leaving local network 14.

In a step 274, client system 12 may perform a remote attestation transaction with banking server 18, for instance by sending the VM integrity measurement to server 18. Server 18 may further verify the integrity of secure VM 150 and when secure VM 150 is in a trusted state, may allow client 12 to access protected resources, such as a bank account. In some embodiments configured for higher security, step 274 may comprise sending HV integrity measurements and/or OS integrity measurements to the banking server, which allows server 18 to also verify the integrity of the hypervisor and/or OS, before allowing the transfer of sensitive information.

In a step 276, banking application 78 may perform a set of transactions with banking server 18, sending and/or receiving data as part of the online banking protocol. When the user decides to leave application 78, in a step 278, a component executing within secure VM 150 (for instance, banking application 78) may receive a user input indicative of the intention to close the application, and may signal to HV 40. One such exemplary input may comprise a keyboard event (the user pressing a key combination), or a GUI event (the user clicking on a graphical element). In response to receiving the signal indicating the user's intent to close application 78, in a step 280, HV 40 may switch client system 12 from executing secure VM 150 back to executing client VM 50. In some embodiments, the switch may be performed by transitioning secure VM 150 into a sleeping state and waking up client VM 50.

The exemplary systems and methods described above allow protecting electronic devices connected to a local network, such as personal computers, tablet computers, and smartphones, from malware that may attempt to transmit sensitive information outside the local network. In typical applications, the local network may represent a corporate Intranet or a home network.

In one use case scenario, a user may remotely access a bank account through an e-banking platform hosted on a server computer system. To access the account, the user is typically required to provide some credentials, such as a password and/or an access code. A similar situation arises in e-commerce applications, wherein the user may also transmit sensitive information (e.g., credit card details) to a remote computer system. Such sensitive data is typically input by the user into an electronic device such as a computer, mobile phone, etc., connected to a communication network. It may be important to the user that sensitive data is not stolen, and that it is only transmitted to the intended destination.

In another use case scenario, employees of a company may need to access sensitive data stored on a corporate server and/or share sensitive data among them within a corporate network. Meanwhile, some computer systems on the corporate network may be configured to connect to the Internet. The company may want to ensure that sensitive corporate data does not leave the corporate network.

In yet another example, members of a family may use a variety of electronic devices, such as computers, tablet devices, mobile phones, TVs, and game consoles, among others. Many such devices have network connection capabilities, and may be configured to connect to the Internet, for instance, to access entertainment content. Parents may want to prevent some such devices, e.g., devices used by children, from accessing the Internet within certain time intervals, and/or from accessing certain types of online content. At the same time, family members may wish to protect their privacy, for instance, by preventing an unauthorized transmission of data from their home to outside parties.

In conventional computer systems, malware can compromise the safety and privacy of data exchange. Malware may attempt to steal private or sensitive information, and to transmit such information to remote parties. Malware may further disable conventional network defenses, such as firewalls and network filters, and may download and install spyware on the user's computer system. Modern malware may execute at processor privilege level similar or greater than that of the operating system, and may thus gain substantial control of the user's machine. Instead of using conventional anti-malware defenses executing on top of the OS, some embodiments of the present invention install a below-OS security component, in the form of a hypervisor. In some embodiments, the hypervisor takes control of the processor at the highest privilege level, and displaces the OS and other applications to a virtual machine. An introspection engine executing at the level of the hypervisor may then be used to protect software executing within the VM from malware. Such security components may execute without altering the user's experience, i.e., the user of the protected machine may be completely unaware that his/her applications are running within a virtual machine, instead of directly on the hardware platform of the respective computer system.

Some embodiments of the present invention further use a network regulator device distinct from the protected computer systems to distribute an image of the hypervisor to each protected computer system. By downloading the hypervisor from a certified trusted source every time the respective hypervisor is needed (e.g., at boot time), some embodiments ensure that the version of the hypervisor executed by the protected systems is not corrupted by malware. In addition, some embodiments use measured boot technology to build a hierarchy of trust for components executing on each protected system. The integrity of each component in a software hierarchy (firmware, hypervisor, OS, etc.) may be verified by the network regulator before the respective component is allowed to execute.

In conventional anti-malware and network filter systems, each protected system may run its own software to control access of the respective system to the Internet. Such systems may be vulnerable to malware, which may disable the local anti-malware and/or network defenses. In contrast, in some embodiments of the present invention, the network regulator may be configured to control access of each protected computer system to the Internet from a central position, for instance from the position of a network gateway. In some embodiments, the network regulator only allows a protected system to access the Internet in response to verifying the integrity of software components (e.g., hypervisor, OS) executing on the respective system, and establishing that such software is in a trusted, unmodified state.

Operating systems may be fairly complex objects, typically amounting to tens or hundreds of megabytes of data. Delivering such objects on demand to a client system every time the respective client system is booted may create substantial data overhead and delays, and may significantly impact user experience. In contrast, instead of distributing an operating system, some embodiments of the present invention distribute a hypervisor. Hypervisors (especially so-called thin-layer hypervisors, having minimal features) may be orders of magnitude less complex than an operating system, ensuring a quick delivery even over wireless networks. Once the hypervisor is launched, some embodiments load the OS from a local source, e.g., a hard drive of the respective client system. Such configurations may minimize deployment time, while still benefitting from the security offered by integrity attestation.

It will be clear to one skilled in the art that the above embodiments may be altered in many ways without departing from the scope of the invention. Accordingly, the scope of the invention should be determined by the following claims and their legal equivalents.

What is claimed is:

1. A network regulator comprising at least one hardware processor configured to execute a client boot agent and a network filter connected to the boot agent, wherein:
the network filter is configured to regulate data transfer between a plurality of client systems and one or more entities, wherein the plurality of client systems are interconnected by a local network, and wherein the one or more entities are outside the local network;
the client boot agent is configured to transmit a hypervisor image to a client system of the plurality of client systems in response to receiving a boot request from the client system, wherein executing the hypervisor image on a processor of the client system causes the client system to launch a hypervisor configured to:
expose a client virtual machine (VM) on the client system, the client VM controlled by the hypervisor, and load an operating system into the client VM; and wherein
regulating data transfer comprises:
employing the network filter to determine whether the hypervisor is in a trusted state according to a hypervisor integrity measurement received from the client system, the hypervisor integrity measurement characterizing the integrity of the hypervisor;
in response to determining whether the hypervisor is in the trusted state, when the hypervisor is in the trusted state,
employing the network filter to allow electronic communications between the client system and the one or more entities outside the local network, and
in response to determining whether the hypervisor is in the trusted state, when the hypervisor is not in the trusted state, employing the network filter to block electronic communications between the client system and the one or more entities outside the local network.

2. The network regulator of claim 1, wherein the network filter is further configured to:
determine whether the operating system is in a trusted state of the operating system according to an operating system integrity measurement received from the client system, wherein the operating system integrity measurement characterizes the integrity of the operating system; and
in response, allow electronic communications between the client system and the one or more entities only when the operating system is in the trusted state of the operating system.

3. The network regulator of claim 1, wherein the hypervisor integrity measurement is cryptographically signed using a key of the client system.

4. The network regulator of claim 1, further configured to transmit the hypervisor image to the client system over a wireless connection between the network regulator and the client system.

5. The network regulator of claim 1, wherein executing the hypervisor image on the processor of the client system further causes the client system to launch an introspection engine executing below the operating system, the introspection engine configured to protect the client system from malware.

6. The network regulator of claim 1, wherein the client boot agent is further configured to transmit a secure VM image to the client system in response to the network filter determining whether the hypervisor is in the trusted state and when the hypervisor is in the trusted state, wherein loading the secure VM image into a memory of the client system causes the client system to execute a secure VM distinct from the client VM.

7. The network regulator of claim 6, wherein the hypervisor is further configured to switch the at least one processor from executing the client VM to executing the secure VM in response to detecting an action of a user of the client system.

8. The network regulator of claim 6, wherein the client system is configured, in response to receiving the secure VM image, to:
determine a VM integrity measurement, the VM integrity measurement characterizing the integrity of the secure VM; and
transmit the VM integrity measurement to the network regulator.

9. The network regulator of claim 1, further configured to route data packets received from multiple client systems on the local network to the one or more entities outside the local network.

10. A client system comprising at least one hardware processor configured to:
receive from a network regulator a hypervisor image in response to sending a boot request to the network regulator over a local network, wherein the network regulator is configured to regulate data transfer between a plurality of client systems and one or more entities, wherein the plurality of client systems are interconnected by the local network, and wherein the one or more entities are outside the local network;
in response to receiving the hypervisor image, execute the hypervisor image to launch a hypervisor;
in response to launching the hypervisor,
expose a client virtual machine (VM) on the client system, the client VM controlled by the hypervisor;
in response to exposing the client VM,
load an operating system into the client VM; and
send a hypervisor integrity measurement to the network regulator, the hypervisor integrity measurement characterizing the integrity of the hypervisor,
and wherein regulating data transfer comprises:
employing the network regulator to determine whether the hypervisor is in a trusted state according to the hypervisor integrity measurement;
in response to determining whether the hypervisor is in the trusted state, when the hypervisor is in the trusted state,
employing the network regulator to allow electronic communications between the client system and the one or more entities outside the local network; and
in response to determining whether the hypervisor is in the trusted state, when the hypervisor is not in the trusted state, employing the network regulator to block electronic communications between the client system and the one or more entities outside the local network.

11. The client system of claim 10, wherein the at least one hardware processor is further configured to:
in response to receiving the hypervisor image, load the hypervisor image into a memory of the client system; and
in response to loading the hypervisor image into the memory, determine the hypervisor integrity measurement according to a content of a memory page storing a part of the hypervisor image.

12. The client system of claim 10, wherein the at least one hardware processor is further configured to transmit an operating system integrity measurement to the network regulator, the operating system integrity measurement characterizing the integrity of the operating system.

13. The client system of claim 10, wherein the at least one hardware processor is further configured to cryptographically sign the hypervisor integrity measurement using a key of the client system.

14. The client system of claim 10, wherein the at least one hardware processor is further configured to receive the hypervisor image from the network regulator over a wireless connection between the network regulator and the client system.

15. The client system of claim 10, wherein executing the hypervisor image further causes the client system to launch an introspection engine executing below the operating system, the introspection engine configured to protect the client system from malware.

16. The client system of claim 10, wherein the at least one hardware processor is further configured to receive from the network regulator a secure VM image in response to sending the hypervisor integrity measurement to the network regulator, wherein loading the secure VM image into a memory of the client system causes the client system to execute a secure VM distinct from the client VM.

17. The client system of claim 16, wherein the hypervisor is further configured to switch the at least one processor from executing the client VM to executing the secure VM in response to detecting an action of a user of the client system.

18. The client system of claim 16, wherein the at least one hardware processor is configured, in response to receiving the secure VM image, to:
- determine a VM integrity measurement, the VM integrity measurement characterizing the integrity of the secure VM; and
- transmit the VM integrity measurement to the network regulator.

19. The client system of claim 10, wherein the network regulator is further configured to route data packets received from multiple client systems on the local network to the one or more entities outside the local network.

20. A non-transitory computer-readable medium storing instructions which, when executed on a processor of a network regulator, cause the network regulator to form a client boot agent and a network filter connected to the boot agent, wherein:
- the network filter is configured to regulate data transfer between a plurality of client systems and one or more entities, wherein the plurality of client systems are interconnected by a local network, and wherein the one or more entities are outside the local network;
- the client boot agent is configured to transmit a hypervisor image to a client system in response to receiving a boot request from the client system over the local network, wherein executing the hypervisor image on a processor of the client system causes the client system to launch a hypervisor configured to:
  - expose a client virtual machine (VM) on the client system, the client VM controlled by the hypervisor, and
  - load an operating system into the client VM; and wherein regulating data transfer comprises:
- employing the network filter to determine whether the hypervisor is in a trusted state according to a hypervisor integrity measurement received from the client system, the hypervisor integrity measurement characterizing the integrity of the hypervisor; and
- in response to determining whether the hypervisor is in the trusted state, when the hypervisor is in the trusted state,
- employing the network filter to allow electronic communications between the client system and the one or more entities outside the local network, and
- in response to determining whether the hypervisor is in the trusted state, when the hypervisor is not in the trusted state, employing the network filter to block electronic communications between the client system and the one or more entities outside the local network.

* * * * *